US010244277B2

(12) United States Patent
Peng et al.

(10) Patent No.: US 10,244,277 B2
(45) Date of Patent: Mar. 26, 2019

(54) VIDEO DATA PROCESSING METHOD AND APPARATUS

(71) Applicant: HUAWEI TECHNOLOGIES CO., LTD., Shenzhen (CN)

(72) Inventors: Fei Peng, Shenzhen (CN); Xuqiang Ren, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/820,723

(22) Filed: Nov. 22, 2017

(65) Prior Publication Data
US 2018/0109825 A1    Apr. 19, 2018

Related U.S. Application Data

(63) Continuation of application No. 14/943,784, filed on Nov. 17, 2015, now Pat. No. 9,860,575, which is a (Continued)

(30) Foreign Application Priority Data

Jun. 27, 2013 (CN) .......................... 2013 1 0263639

(51) Int. Cl.
*H04N 21/23* (2011.01)
*H04N 21/242* (2011.01)
(Continued)

(52) U.S. Cl.
CPC ....... *H04N 21/242* (2013.01); *H04N 21/2221* (2013.01); *H04N 21/2225* (2013.01);
(Continued)

(58) Field of Classification Search
None
See application file for complete search history.

(56) References Cited

U.S. PATENT DOCUMENTS 5,682,195 A     10/1997   Hendricks et al.
7,269,836 B2 *   9/2007   Nogima ............. H04N 21/2181
                                                    348/E5.008
(Continued)

FOREIGN PATENT DOCUMENTS

CN        1259826 A      7/2000
CN      101931788 A    12/2010
(Continued)

OTHER PUBLICATIONS

First Office Action issued in corresponding Chinese Patent Application No. 201310263639.4, dated Dec. 21, 2016, 6 pages.
(Continued)

*Primary Examiner* — Cai Y Chen
(74) *Attorney, Agent, or Firm* — Leydig, Voit & Mayer, Ltd.

(57) ABSTRACT

A video data processing method. The method includes: acquiring a multiple program transport stream identifier of each TS packet; acquiring, a single program transport stream identifier of each TS packet; creating at least one scheduling queue for the at least one TS packet according to the single program transport stream identifier in the first information mapping table; selecting any scheduling queue, and determining a first TS packet of the any scheduling queue meets a scheduling condition, selecting at least one output channel to output the any scheduling queue, and continuing to perform determining on a first TS packet of another scheduling queue until determining on all scheduling queues is completed.

18 Claims, 5 Drawing Sheets

Related U.S. Application Data continuation of application No. PCT/CN2014/070578, filed on Jan. 14, 2014.

(51) Int. Cl.
  *H04N 21/236* (2011.01)
  *H04N 21/262* (2011.01)
  *H04N 21/222* (2011.01)
  *H04N 21/2225* (2011.01)
  *H04N 21/2365* (2011.01)
  *H04N 21/643* (2011.01)
  *H04N 21/8547* (2011.01)
  *H04N 21/234* (2011.01)

(52) U.S. Cl.
  CPC ....... *H04N 21/236* (2013.01); *H04N 21/2365* (2013.01); *H04N 21/23608* (2013.01); *H04N 21/262* (2013.01); *H04N 21/643* (2013.01); *H04N 21/23406* (2013.01); *H04N 21/8547* (2013.01)

(56) References Cited

U.S. PATENT DOCUMENTS

| | | |
|---|---|---|
| 2005/0101246 A1 | 5/2005 | Choi et al. |
| 2005/0152548 A1 | 7/2005 | Wasilewski |
| 2006/0159093 A1 | 7/2006 | Joo et al. |
| 2007/0201702 A1 | 8/2007 | Hendricks et al. |
| 2008/0192647 A1 | 8/2008 | Chew et al. |
| 2008/0216136 A1 | 9/2008 | Pfeffer et al. |
| 2010/0333149 A1 | 12/2010 | Sharma et al. |
| 2012/0177066 A1 | 7/2012 | Spransy et al. |
| 2013/0239137 A1 | 9/2013 | Ha et al. |

FOREIGN PATENT DOCUMENTS

| | | |
|---|---|---|
| CN | 102611916 A | 7/2012 |
| CN | 102665104 A | 9/2012 |
| CN | 202696813 U | 1/2013 |
| JP | 2005006333 A | 1/2005 |
| JP | 2006203905 A | 8/2006 |
| JP | 2007521780 A | 8/2007 |
| JP | 2008199606 A | 8/2008 |
| JP | 2009260979 A | 11/2009 |
| WO | 2012116743 A1 | 9/2012 |

OTHER PUBLICATIONS

Second Office Action issued in corresponding Chinese Patent Application No. 201310263639.4, dated Aug. 9, 2017, 6 pages.

Extended European Search Report issued in corresponding European Patent Application No. 14818051.6, dated Mar. 15, 2016, 14 pages.

Notice of Reasons for Rejection (including English translation) issued in corresponding Japanese Patent Application No. 2016-522192, dated May 9, 2017, 7 pages.

International Search Report and Written Opinion (including English translation) issued in corresponding International Application No. PCT/CN2014/070578, dated Apr. 21, 2014, 22 pages.

\* cited by examiner ically acquiring, from a first information mapping table using
VIDEO DATA PROCESSING METHOD AND APPARATUS

CROSS-REFERENCE TO RELATED APPLICATIONS

This application is a continuation of U.S. patent application Ser. No. 14/943,784, filed on Nov. 17, 2015, which is a continuation of International Application No. PCT/CN2014/070578, filed on Jan. 14, 2014, which claims priority to Chinese Patent Application No. 201310263639.4, filed on Jun. 27, 2013. The entire content of all of the aforementioned patent applications is hereby incorporated by reference in their entireties.

TECHNICAL FIELD

The present disclosure relates to the communications field, and in particular, to a video data processing method and apparatus.

BACKGROUND

At present, existing video program formats include a Multiple Program Transport Stream (MPTS) format (for example, from an integrated receiver decoder device or a multiplexer device) and a Single Program Transport Stream (SPTS) format (for example, from an encoder device). Therefore, a Quadrature Amplitude Modulation (QAM) device or a multiplexer device needs to perform multiplexing on an input SPTS or firstly perform demultiplexing on an input MPTS and then perform re-multiplexing processing, so as to adapt to transport networks with different bandwidth. Nowadays, for a broadcast program of a Broadcast TV (BTV), a multiplexer is generally used to firstly multiplex a bitstream in an MPTS format or an SPTS format from different sources into an MPTS, then the MPTS is transmitted to a QAM device over an Internet Protocol (IP) network, and the QAM device outputs the MPTS in a pass-through manner, which means that a QAM input program and an output program are completely consistent. For bitstreams in the SPTS format or DATA streams that are input to a QAM by a Switched Digital Video (SDV) server, a Video On Demand (VOD) server, a modular cable modem termination system (M-CMTS), and the like, the QAM separately multiplexes the bitstreams in the SPTS format or the DATA streams into different service group. Each VOD stream and each DATA stream are corresponding to a unique service group, while an SDV stream corresponds to multiple service group. In addition, a QAM in a new-generation Universal Edge QAM (UEQAM) or Converged Cable Access Platform (CCAP) architecture can support all of the foregoing services; however, for a BTV or SDV service, cooperation of the foregoing multiplexer is still required to multiplex a BTV program source into an MPTS and to demultiplex an SDV program source to an SPTS, and the UEQAM may complete replication of an entire MPTS or SPTS program stream.

However, in a process of implementing the foregoing video data processing, it is found that, in an existing QAM device, a program source on a QAM output channel can only be a fixed SPTS or MPTS program source, but cannot be an arbitrary SPTS or MPTS program source, and multiple SPTSs that are input to an MPTS input source cannot be multiplexed or replicated to multiple output channels.

SUMMARY

Embodiments of the present disclosure provide a video data processing method and apparatus, which can implement arbitrary video data output on multiple output channels.

To achieve the foregoing objective, the embodiments of the present disclosure use the following technical solutions:

According to a first aspect, a video data processing method is provided, including: acquiring a multiple program transport stream identifier of each transport stream (TS) packet of at least one transport stream TS packet; sequentially acquiring, from a first information mapping table using the multiple program transport stream identifier of each TS packet, a single program transport stream identifier of each TS packet, where the first information mapping table is a table of a mapping relationship between a multiple program transport stream identifier and a single program transport stream identifier; creating at least one scheduling queue for the at least one TS packet according to the single program transport stream identifier in the first information mapping table, where each single program transport stream identifier in the first information mapping table corresponds to one scheduling queue; selecting any scheduling queue, and determining whether a first TS packet of the any scheduling queue meets a scheduling condition; and if the first TS packet of the any scheduling queue meets the scheduling condition, selecting, according to a single program transport stream identifier of the any scheduling queue, at least one output channel to output the any scheduling queue, and continuing to perform determining on a first TS packet of another scheduling queue until determining on all scheduling queues is completed.

In a first possible implementation manner, according to the first aspect, after the determining whether a first TS packet of the any scheduling queue meets a scheduling condition, the method further includes: if the first TS packet of the any scheduling queue does not meet the scheduling condition, skipping the any scheduling queue, and continuing to perform determining on a first TS packet of another scheduling queue until determining on all scheduling queues is completed.

In a second possible implementation manner, according to the first possible implementation manner, the determining whether a first TS packet of the any scheduling queue meets a scheduling condition includes: acquiring, according to enqueue time and scheduling time of the first TS packet of the any scheduling queue, storage time when the first TS packet of the any scheduling queue is stored in storage space, where the enqueue time is generated when the first TS packet of the any scheduling queue is allocated to the storage space, and the scheduling time is generated when the first TS packet of the any scheduling queue is scheduled; determining whether the storage time of the first TS packet of the any scheduling queue is less than preset buffer time; and if the storage time of the first TS packet of the any scheduling queue is greater than or equal to the preset buffer time, determining that the scheduling queue meets the scheduling condition; or if the storage time of the first TS packet of the any scheduling queue is less than the preset buffer time, determining that the scheduling queue does not meet the scheduling condition.

In a third possible implementation manner, according to the second possible implementation manner, the selecting, according to a single program transport stream identifier of the any scheduling queue, at least one output channel to output the any scheduling queue includes: acquiring, from a second information mapping table using the single program transport stream identifier of the any scheduling queue, output information corresponding to the any scheduling queue, where the second information mapping table is a table of a mapping relationship between a single program transport stream identifier and output information, and the output information includes a quantity of times the scheduling queue needs to be output; generating at least one output identifier of the any scheduling queue according to the output information corresponding to the any scheduling queue; acquiring, from a third information mapping table, output channel information corresponding to each output identifier of the at least one output identifier of the any scheduling queue, where the third information mapping table is a table of an information mapping between an output identifier and output channel information, and the output channel information includes an output channel number; and outputting the any scheduling queue according to the output channel information corresponding to each output identifier.

In a fourth possible implementation manner, according to the third possible implementation manner, the generating at least one output identifier of the any scheduling queue according to the output information corresponding to the any scheduling queue includes: if the quantity of times the any scheduling queue needs to be output is at least two, generating at least two output identifiers of the any scheduling queue according to the single program transport stream identifier of the any scheduling queue; or if the quantity of times the any scheduling queue needs to be output is one, generating one output identifier of the any scheduling queue according to the single program transport stream identifier of the any scheduling queue.

In a fifth possible implementation manner, according to the first aspect, the acquiring a multiple program transport stream identifier of each TS packet of at least one TS packet includes: parsing at least one input data packet to obtain packet header information and a TS packet of each input data packet; and acquiring, from a fourth information mapping table according to the packet header information of each input data packet, a multiple program transport stream identifier corresponding to the TS packet of each input data packet, where the fourth information mapping table is a table of a mapping relationship between packet header information and a multiple program transport stream identifier.

In a sixth possible implementation manner, according to the first aspect, the creating at least one scheduling queue for the at least one TS packet according to the single program transport stream identifier in the first information mapping table includes: creating one piece of storage space for each single program transport stream identifier in the first information mapping table; saving each TS packet of the at least one TS packet into the storage space of the single program transport stream identifier corresponding to each TS packet; and generating a corresponding scheduling queue according to the TS packet stored in the storage space of each single program transport stream identifier in the first mapping table.

According to a second aspect, a video data processing apparatus is provided, including: an information configuring module, configured to configure a first information mapping table for an identifier acquiring module and a queue management module; the identifier acquiring module, configured to acquire a multiple program transport stream identifier of each TS packet of at least one TS packet; the identifier acquiring module, further configured to sequentially acquire, from the first information mapping table configured by the information configuring module, a single program transport stream identifier of each TS packet using the multiple program transport stream identifier of each TS packet, where the first information mapping table is a table of a mapping relationship between a multiple program transport stream identifier and a single program transport stream identifier; the queue management module, configured to create at least one scheduling queue for the at least one TS packet according to the single program transport stream identifier in the first information mapping table configured by the information configuring module, where each single program transport stream identifier in the first information mapping table corresponds to one scheduling queue; a data scheduling module, configured to select any scheduling queue generated by the queue management module, and determine whether a first TS packet of the any scheduling queue meets a scheduling condition; and the data scheduling module, further configured to: if the first TS packet of the any scheduling queue meets the scheduling condition, select, according to a single program transport stream identifier of the any scheduling queue, at least one output channel to output the any scheduling queue, and continue to perform determining on a first TS packet of another scheduling queue until determining on all scheduling queues is completed.

In a first possible implementation manner, according to the second aspect, the apparatus further includes: the data scheduling module, further configured to: if the first TS packet of the any scheduling queue does not meet the scheduling condition, skip the any scheduling queue, and continue to perform determining on a first TS packet of another scheduling queue until determining on all scheduling queues is completed.

In a second possible implementation manner, according to the first possible implementation manner, the data scheduling module includes: an information acquiring unit, configured to acquire, according to enqueue time and scheduling time of the first TS packet of the any scheduling queue, storage time when the first TS packet of the any scheduling queue is stored in storage space, where the enqueue time is generated when the first TS packet of the any scheduling queue is allocated to the storage space, and the scheduling time is generated when the first TS packet of the any scheduling queue is scheduled; and a condition determining unit, configured to: determine whether the storage time of the first TS packet of the any scheduling queue acquired by the information acquiring unit is less than preset buffer time; and if the storage time of the first TS packet is greater than or equal to the preset buffer time, determine that the first TS packet of the scheduling queue meets the scheduling condition; or if the storage time of the first TS packet of the any scheduling queue is less than the preset buffer time, determine that the first TS packet of the scheduling queue does not meet the scheduling condition.

In a third possible implementation manner, according to the second possible implementation manner: the information configuring module is further configured to configure a second information mapping table and a third information mapping table for the data scheduling module; and the data scheduling module further includes: the information acquiring unit, further configured to acquire, from the second information mapping table using the single program transport stream identifier of the any scheduling queue, output information corresponding to the any scheduling queue, where the second information mapping table is a table of a mapping relationship between a single program transport stream identifier and output information, and the output information includes a quantity of times the scheduling queue needs to be output; an identifier generating unit, configured to generate at least one output identifier of the any scheduling queue according to the output information corresponding to the any scheduling queue acquired by the information acquiring unit; the information acquiring unit, further configured to acquire, from the third information mapping table, output channel information corresponding to each output identifier of the at least one output identifier of the any scheduling queue, where the third information mapping table is a table of an information mapping between an output identifier and output channel information, and the output channel information includes an output channel number; and a queue outputting unit, further configured to output the any scheduling queue according to the output channel information corresponding to each output identifier acquired by the information acquiring unit.

In a fourth possible implementation manner, according to the third possible implementation manner, the identifier generating unit is specifically configured to: if the quantity of times the any scheduling queue needs to be output is at least two, generate at least two output identifiers of the any scheduling queue according to the single program transport stream identifier of the any scheduling queue acquired by the information acquiring unit; or if the quantity of times the any scheduling queue needs to be output is one, generate one output identifier of the any scheduling queue according to the single program transport stream identifier of the any scheduling queue acquired by the information acquiring unit.

In a fifth possible implementation manner, according to the second aspect, the information configuring module is further configured to configure a fourth information mapping table for the identifier acquiring module; and the identifier acquiring module is configured to: parse at least one input data packet to obtain packet header information and a TS packet of each input data packet; and acquire, from the fourth information mapping table according to the packet header information of each input data packet, a multiple program transport stream identifier corresponding to the TS packet of each input data packet, where the fourth information mapping table is a table of a mapping relationship between packet header information and a multiple program transport stream identifier.

In a sixth possible implementation manner, according to the second aspect, the queue management module is configured to: create one piece of storage space for each single program transport stream identifier in the first information mapping table; save each TS packet of the at least one TS packet into the storage space of the single program transport stream identifier corresponding to each TS packet; and generate a corresponding scheduling queue according to the TS packet stored in the storage space of each single program transport stream identifier in the first information mapping table.

According to the video data processing method and apparatus provided by the embodiments of the present disclosure, scheduling queues that are created for all input TS packets according to single program transport stream identifiers in a first information mapping table are managed in a unified manner, all to-be-scheduled TS packets are scheduled in a unified manner, and when a TS packet in each scheduling queue needs to be output, at least one output channel is selected to output the TS packet, thereby implementing video data output on multiple output channels.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

At present, a digital video is generally transmitted in a TS format. TS streams include two forms, namely SPTS and MPTS, where the SPTS is a transport stream of a single program and is formed by a compressed video stream and audio stream, and the MPTS is a transport stream of multiple programs and is formed by multiple SPTSs. A broadcast program stream generally uses an MPTS transport format at a constant bit rate for transmission in different networks (for example, hybrid fiber-coaxial (HFC)), satellite, and terrestrial broadcasting). Because existing program formats includes an MPTS format (for example, from an integrated receiver decoder device or a multiplexer device) and an SPTS format (for example, from an encoder device), a QAM device or a multiplexer device needs to perform multiplexing on an input SPTS or firstly perform demultiplexing on an input MPTS and then perform re-multiplexing processing, so as to adapt to transport networks with different bandwidth. The QAM device may be applied in fields of digital television (e.g. BTV), switched digital video (SDV), video on demand (VOD), broadband data (Data-Over-Cable Service Interface Specifications (DOCSIS)), and the like; the multiplexer may be applied in fields of BTV, SDV, and the like. Video data mentioned in the present disclosure includes three types of data: broadcast service data, on-demand service data, and network data service data. In view of an application scenario in the prior art in which a QAM device supports a fixed input format, and supports only input of a fixed SPTS or MPTS program source but does not support that an SPTS input to an MPTS input source is replicated to multiple output channels, the present disclosure provides a video data processing method.

Figure 1:
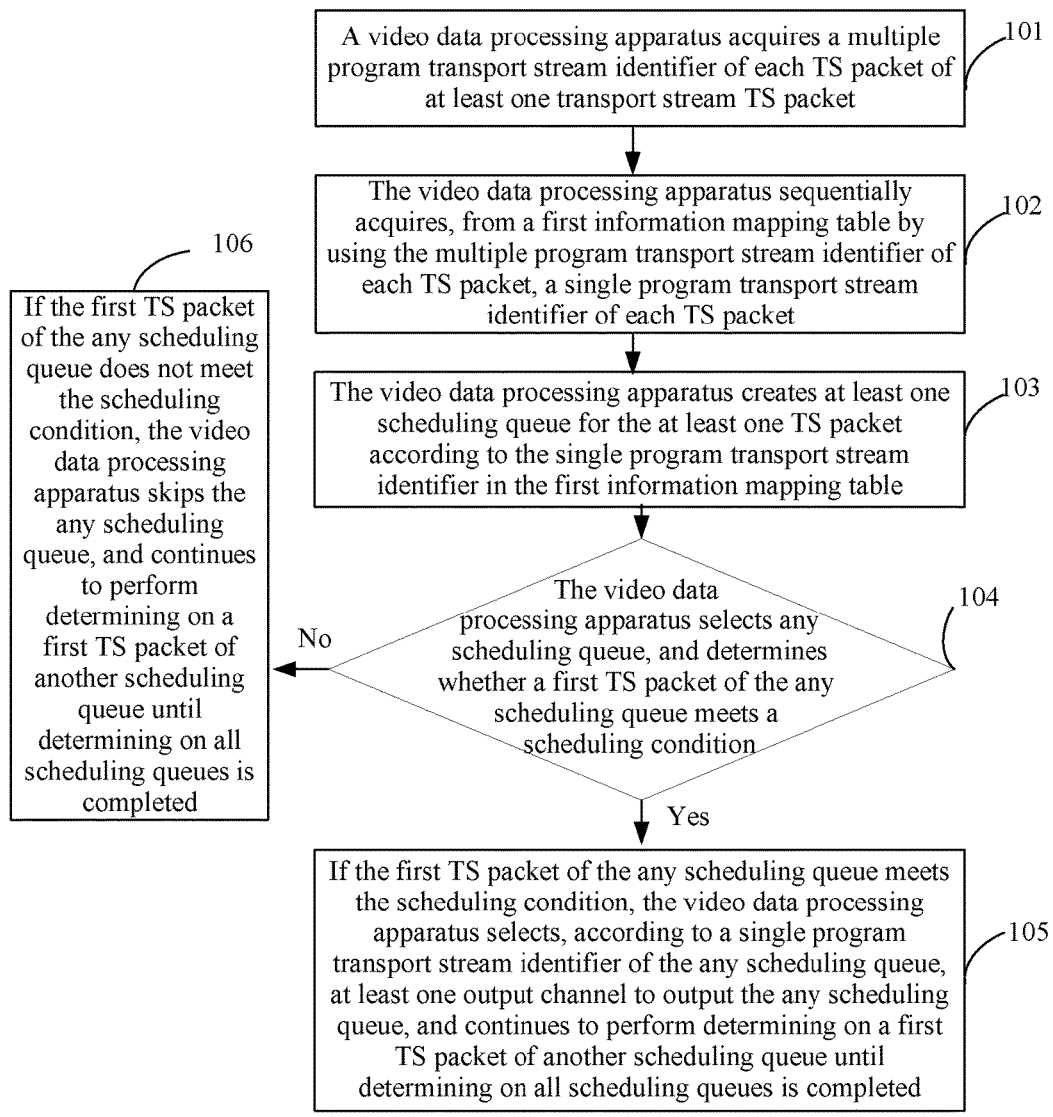
FIG. 1 is a schematic flowchart of a video data processing method according to an embodiment of the present disclosure.

As shown in FIG. 1, the video data processing method includes the following steps:

101. A video data processing apparatus acquires a multiple program transport stream identifier of each TS packet of at least one transport stream TS packet.

102. The video data processing apparatus sequentially acquires, from a first information mapping table using the multiple program transport stream identifier of each TS packet, a single program transport stream identifier of each TS packet.

The foregoing first information mapping table is a table of a mapping relationship between a multiple program transport stream identifier and a single program transport stream identifier. Each TS packet corresponds to one single program transport stream identifier, and single program transport stream identifiers corresponding to different TS packets may be the same.

103. The video data processing apparatus creates at least one scheduling queue for the at least one TS packet according to the single program transport stream identifier in the first information mapping table.

Each single program transport stream identifier in the first information mapping table corresponds to one scheduling queue. Because single program transport stream identifiers corresponding to different TS packets may be the same, a quantity of scheduling queues is set according to the first information mapping table, which may avoid repeatedly setting a scheduling queue for a same single program transport stream identifier. Therefore, in this case, TS packets having a same single program transport stream identifier are allocated to a scheduling queue corresponding to the single program transport stream identifier in sequence.

104. The video data processing apparatus selects any scheduling queue, and determines whether a first TS packet of the any scheduling queue meets a scheduling condition.

It should be noted that, when scheduling the scheduling queues, the video data processing apparatus may randomly select any scheduling queue to schedule, or may schedule the scheduling queues according to a preset scheduling sequence. Because the former scheduling manner includes the latter scheduling manner, the former scheduling manner is described in detail in the following embodiment(s), which is not further described herein.

Because TS packets stored in each scheduling queue are related, determining needs to be performed only on a first TS packet in each scheduling queue herein, to learn whether the scheduling queue meets the scheduling condition.

After step 104, if the first TS packet of the any scheduling queue meets the scheduling condition, the process proceeds to step 105; if the first TS packet of the any scheduling queue does not meet the scheduling condition, the process proceeds to step 106.

105. If the first TS packet of the any scheduling queue meets the scheduling condition, the video data processing apparatus selects, according to a single program transport stream identifier of the any scheduling queue, at least one output channel to output the any scheduling queue, and continues to perform determining on a first TS packet of another scheduling queue until determining on all scheduling queues is completed.

106. If the first TS packet of the any scheduling queue does not meet the scheduling condition, the video data processing apparatus skips the any scheduling queue, and continues to perform determining on a first TS packet of another scheduling queue until determining on all scheduling queues is completed.

According to the video data processing method provided by the embodiment of the present disclosure, scheduling queues that are created for all input TS packets according to single program transport stream identifiers in a first information mapping table are managed in a unified manner, all to-be-scheduled TS packets are scheduled in a unified manner, and when a TS packet in each scheduling queue needs to be output, at least one output channel is selected to output the TS packet, thereby implementing video data output on multiple output channels.

Figure 2A:
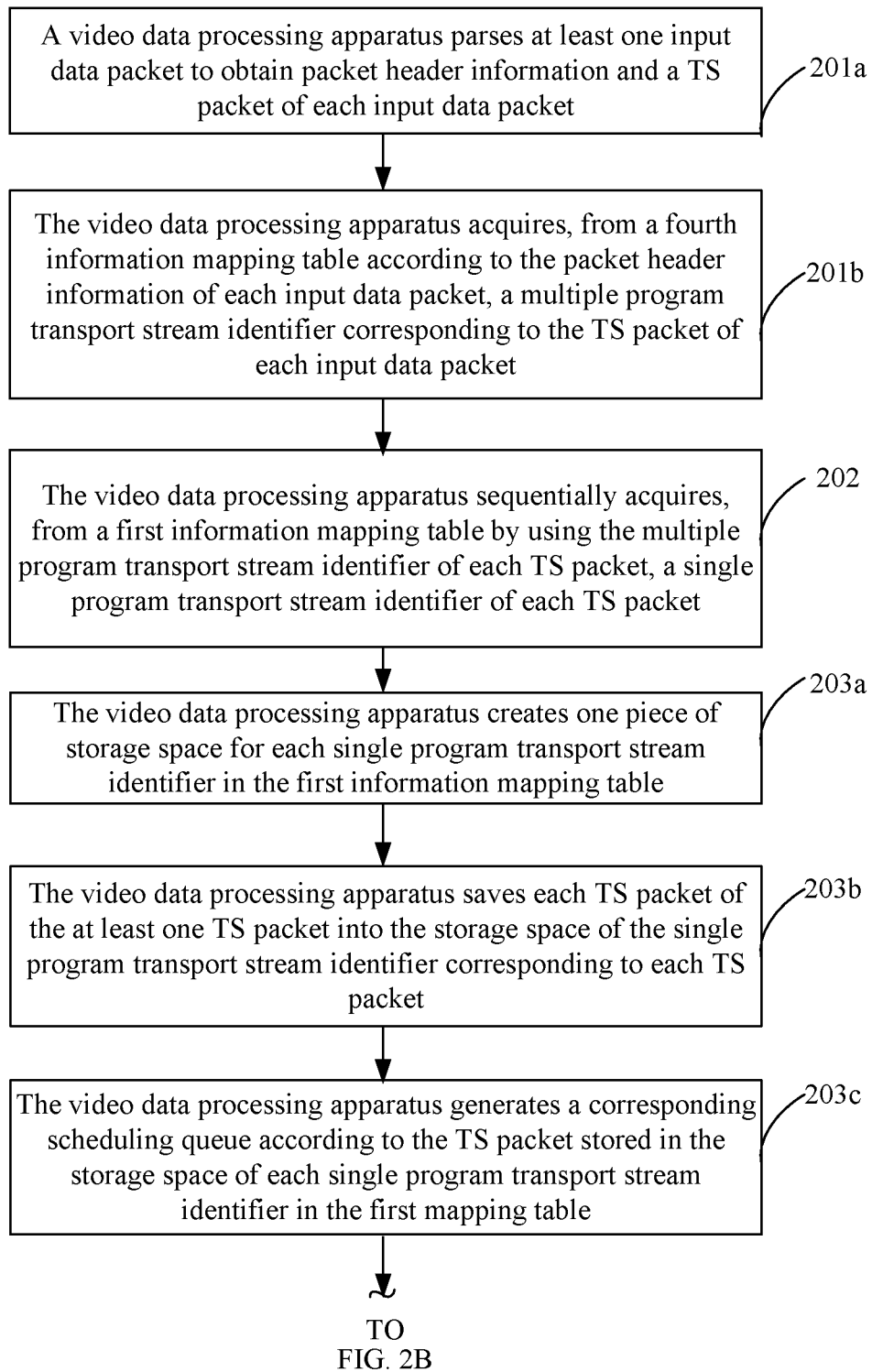
FIG. 2A and FIG. 2B are a schematic flowchart of another video data processing method according to an embodiment of the present disclosure.
Figure 2B:
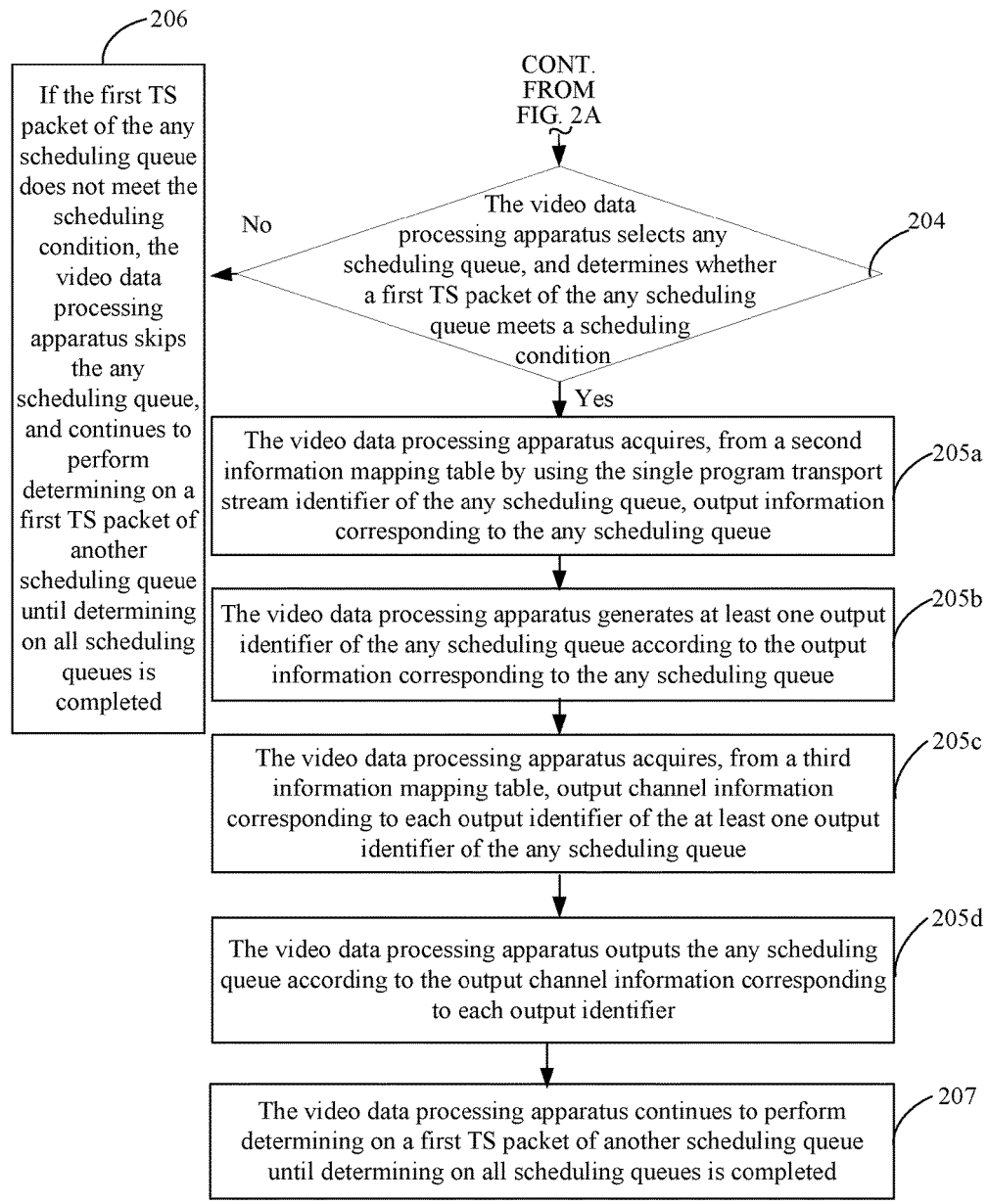

An embodiment of the present disclosure provides another video data processing method. As shown in FIG. 2A and FIG. 2B, the method includes the following steps:

201. A video data processing apparatus acquires a multiple program transport stream identifier of each TS packet of at least one transport stream TS packet.

Optionally, step 201 includes the following steps:

201a. The video data processing apparatus parses at least one input data packet to obtain packet header information and a TS packet of each input data packet.

201b. The video data processing apparatus acquires, from a fourth information mapping table according to the packet header information of each input data packet, a multiple program transport stream identifier corresponding to the TS packet of each input data packet.

The fourth information mapping table is a table of a mapping relationship between packet header information of an input data packet and a multiple program transport stream identifier. The foregoing multiple program transport stream identifier may be represented by MPTS-index. The foregoing packet header information specifically includes but is not limited to a Media Access Control (MAC) value, a User Datagram Protocol (UDP) value, and an IP value.

After receiving at least one input MPTS data packet, the video data processing apparatus firstly parses the at least one MPTS data packet, extracts layer-2, layer-3, and layer-4 packet header information and at least one TS packet that are of the at least one MPTS data packet, adds one piece of packet descriptor information for each TS packet, finally acquires, from the fourth information mapping table according to packet header information of each MPTS data packet, a multiple program transport stream identifier corresponding to each TS packet, and adds the multiple program transport stream identifier corresponding to each TS packet to the packet descriptor information of each TS packet for a follow-up application. It should be noted that not each TS packet obtained by parsing the MPTS data packet can have a corresponding multiple program transport stream identifier found in the fourth information mapping table, and if a search fails, a TS packet is discarded. The at least one input data packet mentioned in the present disclosure refers to an MPTS data packet for which a multiple program transport stream identifier can be found in the fourth information mapping table.

202. The video data processing apparatus sequentially acquires, from a first information mapping table using the multiple program transport stream identifier of each TS packet, a single program transport stream identifier of each TS packet.

The foregoing first information mapping table is a table of a mapping relationship between a multiple program transport stream identifier and a single program transport stream identifier, and one multiple program transport stream identifier may be corresponding to at least one single program transport stream identifier. The foregoing single program transport stream identifier may be represented by spts-index.

The video data processing apparatus adds the single program transport stream identifier of each TS packet to the packet descriptor information for a follow-up application, where the single program transport stream identifier of each TS packet is sequentially obtained by searching the first information mapping table using the multiple program transport stream identifier of each TS packet.

203. The video data processing apparatus creates at least one scheduling queue for the at least one TS packet according to the single program transport stream identifier in the first information mapping table.

Each single program transport stream identifier in the first information mapping table corresponds to one scheduling queue. Because single program transport stream identifiers corresponding to different TS packets may be the same, a quantity of scheduling queues is set according to the first information mapping table, which may avoid repeatedly setting a scheduling queue for a same single program transport stream identifier. Therefore, in this case, TS packets having a same single program transport stream identifier are allocated to a scheduling queue of the single program transport stream identifier in sequence.

Optionally, step 203 includes the following steps:

203*a*. The video data processing apparatus creates one piece of storage space for each single program transport stream identifier in the first information mapping table.

203*b*. The video data processing apparatus saves each TS packet of the at least one TS packet into the storage space of the single program transport stream identifier corresponding to each TS packet.

203*c*. The video data processing apparatus generates a corresponding scheduling queue according to the TS packet stored in the storage space of each single program transport stream identifier in the first mapping table.

The video data processing apparatus creates one piece of storage space in advance for each single program transport stream identifier in the preset first information mapping table; when receiving at least one TS packet, the video data processing apparatus saves, according to a single program transport stream identifier of each TS packet, the at least one TS packet into storage space corresponding to the single program transport stream identifier; and then the TS packets in each piece of storage space separately constitute one scheduling queue, so that scheduling queues corresponding to different video programs are separately maintained. At the same time, TS packet enqueue processing is completed. It should be noted that the TS packet stored in the scheduling queue corresponding to each single program transport stream identifier corresponds to data of a same video program, and corresponding TS packets are sorted according to output time of video programs, that is, sorted according to time when each TS packet is input to the storage space, so as to ensure that the video programs are output according to a normal program time sequence when they are output.

204. The video data processing apparatus selects any scheduling queue, and determines whether a first TS packet of the any scheduling queue meets a scheduling condition.

Because TS packets stored in each scheduling queue are related, determining needs to be performed only on a first TS packet in each scheduling queue herein, to learn whether the scheduling queue meets the scheduling condition.

Optionally, step 204 specifically includes the following steps:

204*a*. The video data processing apparatus acquires, according to enqueue time and scheduling time of the first TS packet of the any scheduling queue, storage time when the first TS packet of the any scheduling queue is stored in storage space.

The enqueue time is generated when the first TS packet of the any scheduling queue is allocated to the storage space, and the scheduling time is generated when the first TS packet of the any scheduling queue is scheduled.

When a multiple program transport stream identifier of the foregoing first TS packet of the any scheduling queue is obtained, a timer needs to be started at the same time according to the multiple program transport stream identifier of the first TS packet, where the timer is used to: when the first TS packet is allocated to storage space corresponding to a single program transport stream identifier of the first TS packet, mark one piece of enqueue time information and add the enqueue time information to packet descriptor information of the first TS packet for follow-up use, and is further used to: when the first TS is scheduled, mark one piece of scheduling time information, which may also be referred to as tracking time information of the first TS packet, that is, current time information of the timer, and at the same time add the scheduling time information to the packet descriptor information of the first TS packet for follow-up use.

204*b*. The video data processing apparatus determines whether the storage time of the first TS packet of the any scheduling queue is less than preset buffer time.

If the storage time of the first TS packet of the any scheduling queue is greater than or equal to the preset buffer time, it is determined that the any scheduling queue meets the scheduling condition; if the storage time of the first TS packet of the any scheduling queue is less than the preset buffer time, it is determined that the scheduling queue does not meet the scheduling condition.

When the foregoing at least one scheduling queue is scheduled in a unified manner, the foregoing steps may be selected, that is, firstly selecting any scheduling queue from the foregoing at least one scheduling queue, determining whether the any scheduling queue meets a scheduling condition, and if the any scheduling queue meets the scheduling condition, selecting a next scheduling queue for determining until determining on all scheduling queues is completed. In addition, separate maintaining and scheduling may also be selected, that is, performing determining on all scheduling queues of the at least one scheduling queue simultaneously, and outputting TS packets stored in a scheduling queue according to a storage sequence as long as the scheduling queue meets the scheduling condition.

After step 204, if the first TS packet of the any scheduling queue meets the scheduling condition, the process proceeds to step 205; if the first TS packet of the any scheduling queue does not meet the scheduling condition, the process proceeds to step 206.

205. If the first TS packet of the any scheduling queue meets the scheduling condition, the video data processing apparatus selects, according to a single program transport stream identifier of the any scheduling queue, at least one output channel to output the any scheduling queue, and continues to perform determining on a first TS packet of another scheduling queue until determining on all scheduling queues is completed.

That the video data processing apparatus selects, according to a single program transport stream identifier of the any scheduling queue, at least one output channel to output the any scheduling queue in step 205 specifically includes the following steps:

205*a*. The video data processing apparatus acquires, from a second information mapping table using the single program transport stream identifier of the any scheduling queue, output information corresponding to the any scheduling queue.

The second information mapping table is a table of a mapping relationship between a single program transport stream identifier and output information, and the output information includes a quantity of times the scheduling queue needs to be output.

The foregoing output identifier may be represented by out-index.

205*b*. The video data processing apparatus generates at least one output identifier of the any scheduling queue according to the output information corresponding to the any scheduling queue.

Further, optionally, step 205*b* includes: a1. if the quantity of times the any scheduling queue needs to be output is at least two, the video data processing apparatus generates at least two output identifiers of the any scheduling queue according to the single program transport stream identifier of the any scheduling queue; or b1. if the quantity of times the any scheduling queue needs to be output is one, the video data processing apparatus generates one output identifier of the any scheduling queue according to the single program transport stream identifier of the any scheduling queue.

205c. The video data processing apparatus acquires, from a third information mapping table, output channel information corresponding to each output identifier of the at least one output identifier of the any scheduling queue.

The third information mapping table is a table of an information mapping between an output identifier and output channel information, and the output channel information includes but is not limited to an output channel number.

205d. The video data processing apparatus outputs the any scheduling queue according to the output channel information corresponding to each output identifier.

That the single program transport stream identifier is spts-index, and the output identifier is out-index is used as an example herein. Therefore, if the first TS packet of the any scheduling queue meets the scheduling condition, spts-index is firstly extracted from the packet descriptor information of the first TS packet of the any scheduling queue, and by querying the second information mapping table according to spts-index of the first TS packet of the any scheduling queue, whether the TS packet needs to be replicated is determined, and if TS packet needs to be replicated, a quantity of required replication times is also acquired. If the any scheduling queue does not need to be replicated, let out-index=spts-index, then a channel number of an output channel corresponding to out-index of the any scheduling queue is found in the third information mapping table, and a TS packet in the any scheduling queue is directly output; if the any scheduling queue needs to be replicated, according to the acquired quantity of required replication times N (N>1), N different out-indexes are generated. A method for generating the N different out-indexes is specifically: combining spts-index with [0:N−1]. For example, if the quantity of replication times N=3, three generated out-indexes are {spts-index, 0}, {spts-index, 1}, and {spts-index, 2} separately, and three copies of the any scheduling queue are obtained by replication. After generating the out-indexes and replicating the scheduling queue are completed, the newly generated out-indexes are added to the packet descriptor information for a follow-up application. Finally, according to the generated out-indexes of the any scheduling queue, channel numbers of three output channels corresponding to the three out-indexes of the any scheduling queue are found in the third information mapping table; finally, the any scheduling queue is output simultaneously on the three output channels found using the three output channel numbers.

In addition, if that the multiple program transport stream identifier is mpts-index, the single program transport stream identifier is spts-index, and the output identifier is out-index is used as an example, in a mapping from mpts-index to spts-index, specifically, mpts-index and spts-index cooperate to complete queue management and queue scheduling, which implements demultiplexing, while in a mapping from spts-index to out-index, stream multiplexing is implemented.

206. If the first TS packet of the any scheduling queue does not meet the scheduling condition, the video data processing apparatus skips the any scheduling queue, and continues to perform determining on a first TS packet of another scheduling queue until determining on all scheduling queues is completed.

207. The video data processing apparatus continues to perform determining on a first TS packet of another scheduling queue until determining on all scheduling queues is completed.

After determining on all scheduling queues is completed, a new round of the determining process is then performed circularly.

It should be noted that the first information mapping table, the second information mapping table, the third information mapping table, and the fourth information mapping table mentioned in the embodiment of the present disclosure may be dynamically configured and modified according to an actual condition.

According to the video data processing method provided by the embodiment of the present disclosure, scheduling queues that are created for all input TS packets according to single program transport stream identifiers in a first information mapping table are managed in a unified manner, all to-be-scheduled TS packets are scheduled in a unified manner, and when a TS packet in each scheduling queue needs to be output, at least one output channel is selected to output the TS packet, thereby implementing video data output on multiple output channels.

Figure 3:
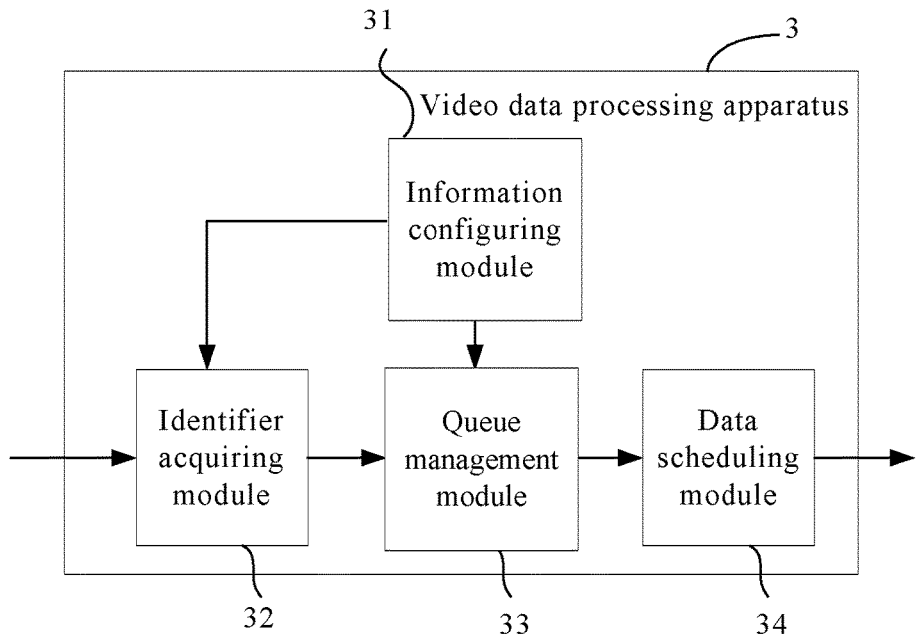
FIG. 3 is a schematic structural diagram of a video data processing apparatus according to an embodiment of the present disclosure.
Figure 4:
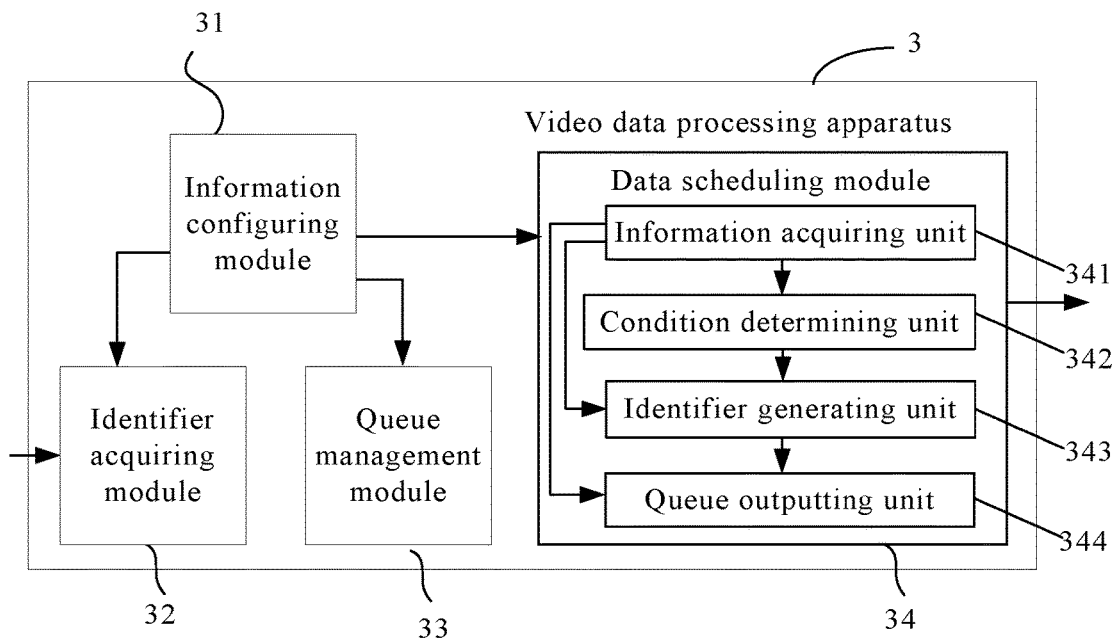
FIG. 4 is a schematic structural diagram of another video data processing apparatus according to an embodiment of the present disclosure.

An embodiment of the present disclosure provides a video data processing apparatus. As shown in FIG. 3, the video data processing apparatus is used to implement the foregoing video data processing method, and the video data processing apparatus may be considered as a multiplexing module in a QAM device. An existing QAM device includes: UEQAM, Edge QAM (EQAM) that is also called IPQAM (Internet Protocol QAM), and conventional QAM. The video data processing apparatus 3 includes: an information configuring module 31, an identifier acquiring module 32, a queue management module 33, and a data scheduling module 34.

The information configuring module 31 is configured to configure a first information mapping table for the identifier acquiring module 32 and the queue management module 33.

The identifier acquiring module 32 is configured to acquire a multiple program transport stream identifier of each TS packet of at least one TS packet.

The identifier acquiring module 32 is further configured to sequentially acquire, from the first information mapping table configured by the information configuring module 31, a single program transport stream identifier of each TS packet using the multiple program transport stream identifier of each TS packet, where the first information mapping table is a table of a mapping relationship between a multiple program transport stream identifier and a single program transport stream identifier.

The queue management module 33 is configured to create at least one scheduling queue for the at least one TS packet according to the single program transport stream identifier in the first information mapping table configured by the information configuring module 31, where each single program transport stream identifier in the first information mapping table corresponds to one scheduling queue.

The data scheduling module 34 is configured to select any scheduling queue generated by the queue management module 33, and determine whether a first TS packet of the any scheduling queue meets a scheduling condition.

The data scheduling module 34 is further configured to: if the first TS packet of the any scheduling queue meets the scheduling condition, select, according to a single program transport stream identifier of the any scheduling queue, at least one output channel to output the any scheduling queue, and continue to perform determining on a first TS packet of another scheduling queue until determining on all scheduling queues is completed.

Optionally, the data scheduling module 34 is further configured to: if the first TS packet of the any scheduling queue does not meet the scheduling condition, skip the any scheduling queue, and continue to perform determining on a first TS packet of another scheduling queue until determining on all scheduling queues is completed.

Optionally, the data scheduling module 34 includes: an information acquiring unit 341 and a condition determining unit 342.

The information acquiring unit 341 is configured to acquire, according to enqueue time and scheduling time of the first TS packet of the any scheduling queue, storage time when the first TS packet of the any scheduling queue is stored in storage space, where the enqueue time is generated when the first TS packet of the any scheduling queue is allocated to the storage space, and the scheduling time is generated when the first TS packet of the any scheduling queue is scheduled.

The condition determining unit 342 is configured to: determine whether the storage time of the first TS packet of the any scheduling queue acquired by the information acquiring unit 341 is less than preset buffer time; and if the storage time of the first TS packet of the any scheduling queue is greater than or equal to the preset buffer time, determine that the first TS packet of the scheduling queue meets the scheduling condition; or if the storage time of the first TS packet of the any scheduling queue is less than the preset buffer time, determine that the first TS packet of the scheduling queue does not meet the scheduling condition.

Optionally, the information configuring module 31 is further configured to configure a second information mapping table and a third information mapping table for the data scheduling module 34.

The data scheduling module 34 further includes: an identifier generating unit 343 and a queue outputting unit 344.

The information acquiring unit 341 is further configured to acquire, from the second information mapping table using the single program transport stream identifier of the any scheduling queue, output information corresponding to the any scheduling queue, where the second information mapping table is a table of a mapping relationship between a single program transport stream identifier and output information, and the output information includes a quantity of times the scheduling queue needs to be output.

The identifier generating unit 343 is configured to generate at least one output identifier of the any scheduling queue according to the output information corresponding to the any scheduling queue acquired by the information acquiring unit 341.

The information acquiring unit 341 is further configured to acquire, from the third information mapping table, output channel information corresponding to each output identifier of the at least one output identifier of the any scheduling queue, where the third information mapping table is a table of an information mapping between an output identifier and output channel information, and the output channel information includes an output channel number.

The queue outputting unit 344 is further configured to output the any scheduling queue according to the output channel information corresponding to each output identifier acquired by the information acquiring unit 341.

Optionally, the identifier generating unit 343 is specifically configured to: if the quantity of times the any scheduling queue needs to be output is at least two, generate at least two output identifiers of the any scheduling queue according to the single program transport stream identifier of the any scheduling queue acquired by the information acquiring unit 341; or if the quantity of times the any scheduling queue needs to be output is one, generate one output identifier of the any scheduling queue according to the single program transport stream identifier of the any scheduling queue acquired by the information acquiring unit 341.

Optionally, the information configuring module 31 is further configured to configure a fourth information mapping table for the identifier acquiring module 32.

The identifier acquiring module 32 is specifically configured to: parse at least one input data packet to obtain packet header information and a TS packet of each input data packet; and acquire, from the fourth information mapping table according to the packet header information of each input data packet, a multiple program transport stream identifier corresponding to the TS packet of each input data packet, where the fourth information mapping table is a table of a mapping relationship between packet header information and a multiple program transport stream identifier.

Optionally, the queue management module 33 is configured to: create one piece of storage space for each single program transport stream identifier in the first information mapping table; save each TS packet of the at least one TS packet into the storage space of the single program transport stream identifier corresponding to each TS packet; and generate a corresponding scheduling queue according to the TS packet stored in the storage space of each single program transport stream identifier in the first information mapping table.

According to the video data processing apparatus provided by the embodiment of the present disclosure, scheduling queues that are created for all input TS packets according to single program transport stream identifiers in a first information mapping table are managed in a unified manner, all to-be-scheduled TS packets are scheduled in a unified manner, and when each TS packet is to be output, at least one output channel is selected to output the TS packet, thereby implementing video data output on multiple output channels.

Figure 5:
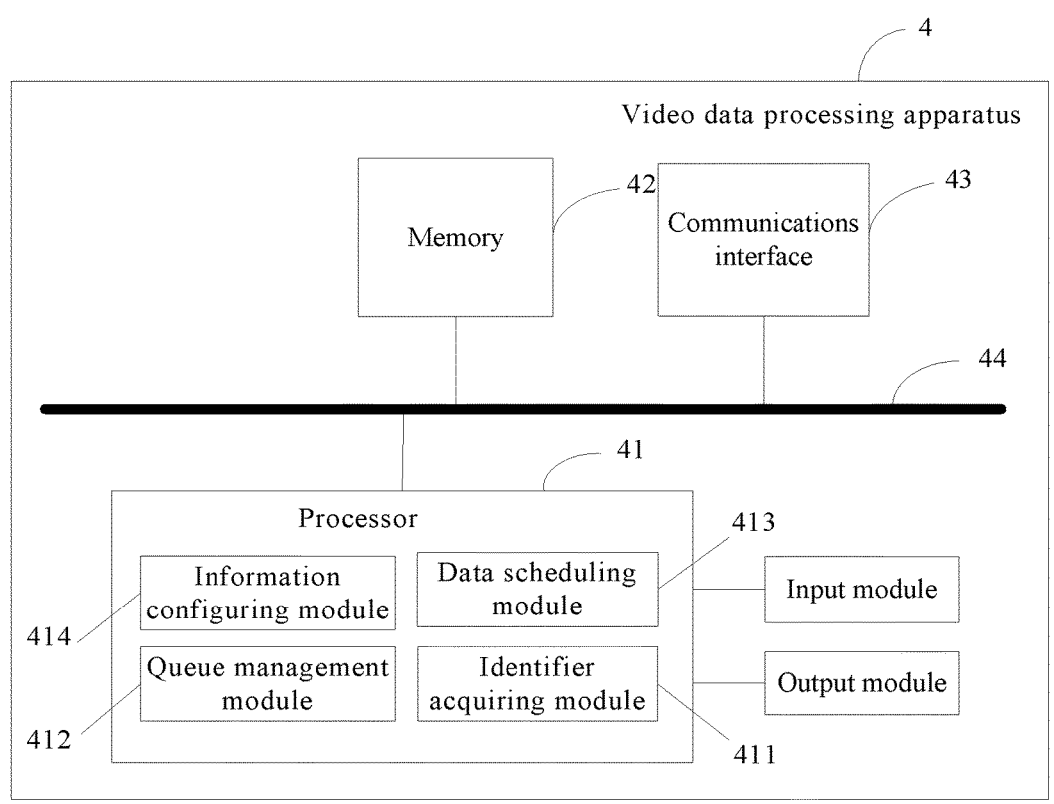
FIG. 5 is a schematic structural diagram of a video data processing apparatus according to another embodiment of the present disclosure.

FIG. 5 is a schematic structural diagram of a video data processing apparatus according to another embodiment of the present disclosure. The video data processing apparatus is used to implement the foregoing video data processing method, and the video data processing apparatus may be a multiplexing module in a QAM device. The video data processing apparatus 4 includes a processor 41, a memory 42, a communications interface 43, and a bus 44.

The processor 41 may include: an identifier acquiring module 411, a queue management module 412, and a data scheduling module 413; the processor 41 further includes an information configuring module 414 that configures required data for the other modules in the processor 41.

Specific implementation functions of the foregoing modules in the processor 41 and the memory 42 are as follows:

The information configuring module 414 is configured to configure a first information mapping table for the identifier acquiring module 32 and the queue management module 33.

The identifier acquiring module 411 is configured to acquire a multiple program transport stream identifier of each TS packet of at least one TS packet.

The identifier acquiring module 411 is further configured to sequentially acquire, from the first information mapping table configured by the information configuring module 411, a single program transport stream identifier of each TS packet using the multiple program transport stream identifier of each TS packet, where the first information mapping table is a table of a mapping relationship between a multiple program transport stream identifier and a single program transport stream identifier.

The queue management module 412 is configured to create at least one scheduling queue for the at least one TS packet according to the single program transport stream identifier in the first information mapping table configured by the information configuring module 414, where each single program transport stream identifier in the first information mapping table corresponds to one scheduling queue.

The data scheduling module 413 is configured to select any scheduling queue generated by the queue management module 412, and determine whether a first TS packet of the any scheduling queue meets a scheduling condition.

The data scheduling module 413 is further configured to: if the first TS packet of the any scheduling queue meets the scheduling condition, select, according to a single program transport stream identifier of the any scheduling queue, at least one output channel to output the any scheduling queue, and continue to perform determining on a first TS packet of another scheduling queue until determining on all scheduling queues is completed.

Optionally, the data scheduling module 413 is further configured to: if the first TS packet of the any scheduling queue does not meet the scheduling condition, skip the any scheduling queue, and continue to perform determining on a first TS packet of another scheduling queue until determining on all scheduling queues is completed.

Optionally, the data scheduling module 413 includes: an information acquiring unit and a condition determining unit.

The information acquiring unit is configured to acquire, according to enqueue time and scheduling time of the first TS packet of the any scheduling queue, storage time when the first TS packet of the any scheduling queue is stored in storage space, where the enqueue time is generated when the first TS packet of the any scheduling queue is allocated to the storage space, and the scheduling time is generated when the first TS packet of the any scheduling queue is scheduled.

The condition determining unit is configured to: determine whether the storage time of the first TS packet of the any scheduling queue acquired by the information acquiring unit is less than preset buffer time; and if the storage time of the first TS packet of the any scheduling queue is greater than or equal to the preset buffer time, determine that the first TS packet of the scheduling queue meets the scheduling condition; or if the storage time of the first TS packet of the any scheduling queue is less than the preset buffer time, determine that the first TS packet of the scheduling queue does not meet the scheduling condition.

Optionally, the information configuring module 414 is further configured to configure a second information mapping table and a third information mapping table for the data scheduling module 413.

The data scheduling module 413 further includes: an identifier generating unit and a queue outputting unit.

The information acquiring unit is further configured to acquire, from the second information mapping table using the single program transport stream identifier of the any scheduling queue, output information corresponding to the any scheduling queue, where the second information mapping table is a table of a mapping relationship between a single program transport stream identifier and output information, and the output information includes a quantity of times the scheduling queue needs to be output.

The identifier generating unit is configured to generate at least one output identifier of the any scheduling queue according to the output information corresponding to the any scheduling queue acquired by the information acquiring unit.

The information acquiring unit is further configured to acquire, from the third information mapping table, output channel information corresponding to each output identifier of the at least one output identifier of the any scheduling queue, where the third information mapping table is a table of an information mapping between an output identifier and output channel information, and the output channel information includes an output channel number.

The queue outputting unit is further configured to output the any scheduling queue according to the output channel information corresponding to each output identifier acquired by the information acquiring unit.

Optionally, the identifier generating unit is specifically configured to: if the quantity of times the any scheduling queue needs to be output is at least two, generate at least two output identifiers of the any scheduling queue according to the single program transport stream identifier of the any scheduling queue acquired by the information acquiring unit; or if the quantity of times the any scheduling queue needs to be output is one, generate one output identifier of the any scheduling queue according to the single program transport stream identifier of the any scheduling queue acquired by the information acquiring unit.

Optionally, the information configuring module 414 is further configured to configure a fourth information mapping table for the identifier acquiring module 411.

The identifier acquiring module 411 is configured to: parse at least one input data packet to obtain packet header information and a TS packet of each input data packet; and acquire, from the fourth information mapping table according to the packet header information of each input data packet, a multiple program transport stream identifier corresponding to the TS packet of each input data packet, where the fourth information mapping table is a table of a mapping relationship between packet header information and a multiple program transport stream identifier.

Optionally, the queue management module 412 is configured to: create one piece of storage space for each single program transport stream identifier in the first information mapping table; save each TS packet of the at least one TS packet into the storage space of the single program transport stream identifier corresponding to each TS packet; and generate a corresponding scheduling queue according to the TS packet stored in the storage space of each single program transport stream identifier in the first information mapping table.

According to the video data processing apparatus provided by the embodiment of the present disclosure, scheduling queues that are created for all input TS packets according to single program transport stream identifiers in a first information mapping table are managed in a unified manner, all to-be-scheduled TS packets are scheduled in a unified manner, and when each TS packet is to be output, at least one output channel is selected to output the TS packet, thereby implementing video data output on multiple output channels.

A person of ordinary skill in the art may understand that all or some of the steps of the method embodiments may be implemented by a program instructing relevant hardware.

The program may be stored in a computer-readable storage medium. When the program runs, the steps of the method embodiments are performed. The foregoing storage medium includes: any medium that can store program code, such as a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A video data processing method, comprising:
   acquiring a multiple program transport stream (MPTS) identifier of at least one transport stream (TS) packet;
   acquiring, from a first information mapping table using the MPTS identifier of each TS packet, a single program transport stream (SPTS) identifier for the TS packet, wherein the first information mapping table is a table that comprises a mapping relationship between the MPTS identifier and the SPTS identifier;
   for each set of the at least one TS packet having a same SPTS identifier, creating a scheduling queue of packets wherein the scheduling queue is associated with the SPTS identifier;
   performing following steps for each scheduling queue that has not been outputted until all scheduling queues have been outputted:
   determining whether a first TS packet at a head of the scheduling queue meets a scheduling condition;
   when the first TS packet meets the scheduling condition, selecting, according to the SPTS identifier associated with the scheduling queue, at least one output channel to output the scheduling queue and outputting the scheduling queue on the at least one output channel.

2. The method according to claim 1, wherein determining whether the first TS packet at the head of the scheduling queue meets the scheduling condition comprises:
   acquiring, according to an enqueue time and a scheduling time of the first TS packet, a storage time when the first TS packet was stored in a storage space, wherein the enqueue time is generated when the first TS packet is allocated to the storage space and the scheduling time is generated when the first TS packet is scheduled;
   determining whether the storage time of the first TS packet is less than a preset buffer time;
   determining that the first TS packet meets the scheduling condition when the storage time of the first TS packet is greater than or equal to the preset buffer time; and
   determining that the first TS packet does not meet the scheduling condition when the storage time of the first TS packet is less than the preset buffer time.

3. The method according to claim 1, wherein outputting the scheduling queue on the at least one output channel comprises:
   acquiring, from a second information mapping table using the SPTS identifier associated with the scheduling queue, output information corresponding to the scheduling queue, wherein the second information mapping table comprises a table that comprises a mapping relationship between the SPTS identifier and the output information, and wherein the output information comprises a quantity of times the scheduling queue needs to be outputted;
   generating at least one output identifier of the scheduling queue according to the output information corresponding to the scheduling queue;
   acquiring, from a third information mapping table, output channel information corresponding to each output identifier of the at least one output identifier of the scheduling queue, wherein the third information mapping table is a table that comprises an information mapping between an output identifier and the output channel information, and the output channel information comprises an output channel number; and
   outputting the scheduling queue according to the output channel information corresponding to the output identifier.

4. The method according to claim 3, wherein generating the output identifier of the scheduling queue according to the output information corresponding to the scheduling queue comprises:
   generating at least two output identifiers of the scheduling queue according to the SPTS identifier associated with the scheduling queue when the quantity of times the scheduling queue needs to be outputted is at least two; and
   generating one output identifier of the scheduling queue according to the SPTS identifier associated with the scheduling queue when the quantity of times the scheduling queue needs to be outputted is one.

5. The method according to claim 1, wherein acquiring the MPTS identifier of the at least one TS packet comprises:
   parsing each of one or more input data packets to obtain packet header information and a TS packet; and
   for each TS packet, acquiring the MPTS identifier of the TS packet based on the packet header information of the input data packet from which the TS packet was obtained.

6. The method according to claim 1, wherein creating the scheduling queue of the packets comprises:
   creating a storage space for each SPTS identifier in the first information mapping table;
   saving each TS packet having the same SPTS identifier into the storage space of the SPTS identifier corresponding to each TS packet; and
   generating the scheduling queue according to the TS packet stored in the storage space of each SPTS identifier in the first mapping table.

7. A computer program product for video data processing in a Quadrature Amplitude Modulation (QAM) device, comprising computer executable instructions stored on a non-transitory storage medium such that when the executable instructions are executed by a processor the instructions instruct the QAM device to:
   acquire a multiple program transport stream (MPTS) identifier of at least one transport stream (TS) packet;
   acquire, from a first information mapping table, a single program transport stream (SPTS) identifier of each TS packet using the MPTS identifier of the TS packet, wherein the first information mapping table is a table that comprises a mapping relationship between the MPTS identifier and the SPTS identifier;
   for each set of the at least one TS packets having a same SPTS identifier, create a scheduling queue of packets wherein the scheduling queue is associated with the SPTS identifier;

for each the scheduling queue that has not been outputted until all scheduling queues have been outputted, the QAM device is instructed to:
determine whether a first TS packet at a head of the scheduling queue meets a scheduling condition;
determine that the first TS packet meets the scheduling condition;
select, according to the SPTS identifier associated with the scheduling queue, at least one output channel to output the scheduling queue and output the scheduling queue on the at least one output channel.

8. The computer program product according to claim 7, wherein the instructions to select, according to the SPTS identifier associated with the scheduling queue, the at least one output channel to output the scheduling queue further cause the QAM device to:
acquire, according to an enqueue time and a scheduling time of the first TS packet, a storage time when the first TS packet was stored in a storage space, wherein the enqueue time is generated when the first TS packet is allocated to the storage space, and wherein the scheduling time is generated when the first TS packet is scheduled;
determine whether the storage time of the first TS packet is less than a preset buffer time;
determine that the first TS packet meets the scheduling condition when the storage time of the first TS packet is greater than or equal to the preset buffer time; and
determine that the first TS packet does not meet the scheduling condition when the storage time of the first TS packet is less than the preset buffer time.

9. The computer program product according to claim 7, wherein the instructions further cause the QAM device to:
configure a second information mapping table and a third information mapping table;
acquire, from the second information mapping table using the SPTS identifier associated with the scheduling queue, output information corresponding to the scheduling queue, wherein the second information mapping table comprises a table that comprises a mapping relationship between the SPTS identifier and the output information, and the output information comprises a quantity of times the scheduling queue needs to be outputted;
generate at least one output identifier of the scheduling queue according to the output information corresponding to the scheduling queue;
acquire, from the third information mapping table, output channel information corresponding to each output identifier of the at least one output identifier of the scheduling queue, wherein the third information mapping table is a table that comprises an information mapping between an output identifier and the output channel information, and the output channel information comprises an output channel number; and
output the scheduling queue according to the output channel information corresponding to the output identifier acquired.

10. The computer program product according to claim 9, wherein the instructions further cause the QAM device:
generate at least two output identifiers of the scheduling queue according to the SPTS identifier associated with the scheduling queue when the quantity of times the scheduling queue needs to be outputted is at least two; and
generate one output identifier of the any scheduling queue according to the SPTS identifier associated with the scheduling queue when the quantity of times the scheduling queue needs to be outputted is one.

11. The computer program product according to claim 7, wherein the instructions further cause the QAM device to:
configure a fourth information mapping table;
parse at least one input data packet to obtain packet header information and a TS packet of each input data packet; and
acquire, from the fourth information mapping table according to the packet header information of each input data packet, the MPTS identifier corresponding to the TS packet of each input data packet, wherein the fourth information mapping table comprises a table that comprises a mapping relationship between the packet header information and the MPTS identifier.

12. The computer program product according to claim 8, wherein the instructions further cause the QAM device to:
create a storage space for each SPTS identifier in the first information mapping table;
save each TS packet having the same SPTS identifier into the storage space of the SPTS identifier corresponding to each TS packet; and
generate the scheduling queue according to the TS packet stored in the storage space of each SPTS identifier in the first information mapping table.

13. An apparatus for video data processing, comprising:
a processor; and
a memory configured for storing an instruction that is executable by the processor,
wherein the processor is configured to:
acquire a multiple program transport stream (MPTS) identifier of at least one transport stream (TS) packet;
acquire, from a first information mapping table, a single program transport stream (SPTS) identifier of each TS packet using the MPTS identifier of the TS packet, wherein the first information mapping table is a table that comprises a mapping relationship between the MPTS identifier and the SPTS identifier;
for each set of the at least one TS packets having a same SPTS identifier, create a scheduling queue of packets wherein the scheduling queue is associated with the SPTS identifier;
for each the scheduling queue that has not been outputted until all scheduling queues have been outputted, the processor is configured to:
determine whether a first TS packet at a head of the scheduling queue meets a scheduling condition;
determine that the first TS packet meets the scheduling condition;
select, according to the SPTS identifier associated with the scheduling queue, at least one output channel to output the scheduling queue and output the scheduling queue on the at least one output channel; and
acquire, from a second information mapping table using the SPTS identifier associated with the scheduling queue, output information corresponding to the scheduling queue, wherein the second information mapping table comprises a table that comprises a mapping relationship between the SPTS identifier and the output information, and the output information comprises a quantity of times the scheduling queue needs to be outputted.

14. The apparatus of claim 13, wherein the processor is further configured to:
acquire, according to an enqueue time and a scheduling time of the first TS packet, a storage time when the first TS packet was stored in a storage space, wherein the enqueue time is generated when the first TS packet is allocated to the storage space, and wherein the scheduling time is generated when the first TS packet is scheduled;

determine whether the storage time of the first TS packet is less than a preset buffer time;

determine that the first TS packet meets the scheduling condition when the storage time of the first TS packet is greater than or equal to the preset buffer time; and determine that the first TS packet does not meet the scheduling condition when the storage time of the first TS packet is less than the preset buffer time.

15. The apparatus of claim 13, wherein the processor is further configured to:

configure a third information mapping table;

generate at least one output identifier of the scheduling queue according to the output information corresponding to the scheduling queue;

acquire, from the third information mapping table, output channel information corresponding to each output identifier of the at least one output identifier of the scheduling queue, wherein the third information mapping table is a table that comprises an information mapping between an output identifier and the output channel information, and the output channel information comprises an output channel number; and output the scheduling queue according to the output channel information corresponding to the output identifier acquired.

16. The apparatus of claim 15, wherein the processor is further configured to:

generate at least two output identifiers of the scheduling queue according to the SPTS identifier associated with the scheduling queue when the quantity of times the scheduling queue needs to be outputted is at least two; and generate one output identifier of the any scheduling queue according to the SPTS identifier associated with the scheduling queue when the quantity of times the scheduling queue needs to be outputted is one.

17. The apparatus of claim 13, wherein the processor is further configured to:

configure a fourth information mapping table;

parse at least one input data packet to obtain packet header information and a TS packet of each input data packet; and acquire, from the fourth information mapping table according to the packet header information of each input data packet, the MPTS identifier corresponding to the TS packet of each input data packet, wherein the fourth information mapping table is a table that comprises a mapping relationship between the packet header information and the MPTS identifier.

18. The apparatus of claim 14, wherein the processor is further configured to:

create a storage space for each SPTS identifier in the first information mapping table;

save each TS packet having the same SPTS identifier into the storage space of the SPTS identifier corresponding to each TS packet; and generate the scheduling queue according to the TS packet stored in the storage space of each SPTS identifier in the first information mapping table.

* * * * *